(12) United States Patent
Gauthier

(10) Patent No.: US 7,921,825 B2
(45) Date of Patent: Apr. 12, 2011

(54) ENGINE COMPRISING BALANCE SHAFTS LOCKED BY A PIN

(75) Inventor: Philippe Gauthier, Pontoise (FR)

(73) Assignee: Renault S.A.S., Boulogne Billancourt (FR)

( * ) Notice: Subject to any disclaimer, the term of this patent is extended or adjusted under 35 U.S.C. 154(b) by 488 days.

(21) Appl. No.: 11/914,319

(22) PCT Filed: May 12, 2006

(86) PCT No.: PCT/FR2006/050436
§ 371 (c)(1),
(2), (4) Date: Oct. 10, 2008

(87) PCT Pub. No.: WO2007/003812
PCT Pub. Date: Jan. 11, 2007

(65) Prior Publication Data
US 2009/0173308 A1    Jul. 9, 2009

(30) Foreign Application Priority Data
May 12, 2005    (FR) ...................................... 05 04769

(51) Int. Cl.
*F02B 75/06*    (2006.01)

(52) U.S. Cl. .................................................. 123/192.2

(58) Field of Classification Search ................ 123/192.2
See application file for complete search history.

(56) References Cited

U.S. PATENT DOCUMENTS
5,535,643 A    7/1996    Garza

FOREIGN PATENT DOCUMENTS
| DE | 39 26 430 | 2/1991 |
|---|---|---|
| EP | 0 532 377 | 3/1993 |
| EP | 1 445 509 | 8/2004 |
| WO | 2004 106716 | 12/2004 |

*Primary Examiner* — Noah Kamen
(74) *Attorney, Agent, or Firm* — Oblon, Spivak, McClelland, Maier & Neustadt, L.L.P.

(57) ABSTRACT

A heat engine including at least one engine block that rotatably receives a crankshaft and a cartridge fixed to the engine block and that rotatably receives a pair of parallel balance shafts, namely a primary shaft and a secondary shaft, which are rotated by the crankshaft. A ring gear is rotationally connected to the crankshaft, permanently meshing with a first pinion borne by one end of the primary balance shaft. In addition, a second pinion, borne by the end of the primary balance shaft, meshes with a pinion borne by one end of the secondary balance shaft. Transverse holes extend through the ends of the primary and secondary balance shafts and are configured to be aligned with one another, before the cartridge is mounted to the engine block, to receive a pin.

6 Claims, 3 Drawing Sheets

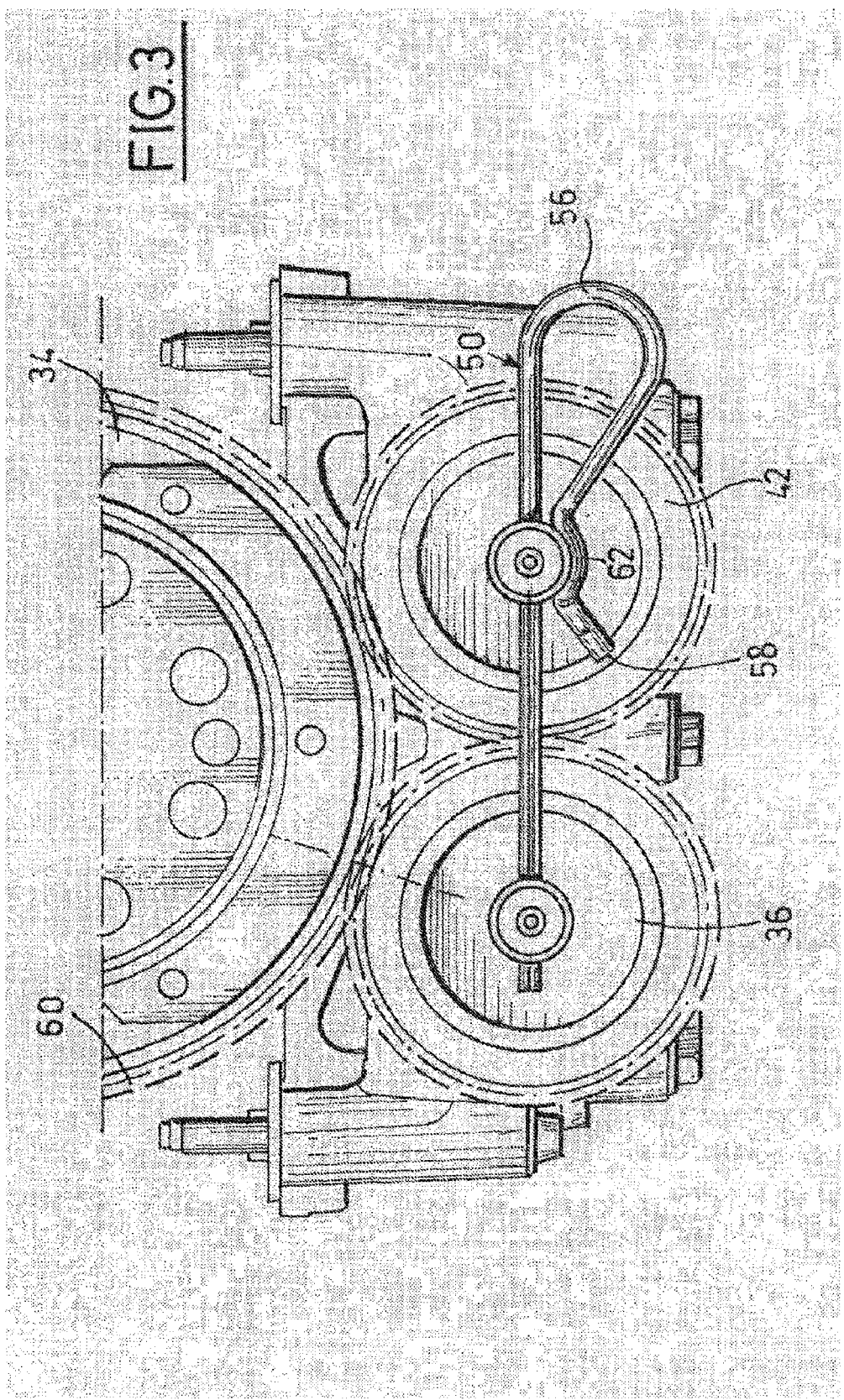

ENGINE COMPRISING BALANCE SHAFTS LOCKED BY A PIN

BACKGROUND OF THE INVENTION

The invention relates to a heat engine for a motor vehicle.

The invention relates more specifically to a heat engine, particularly for a motor vehicle, of the type which comprises at least one engine block rotatably receiving a crankshaft and a housing fixed to the engine block, which rotatably receives a pair of parallel balance shafts, namely a primary shaft and a secondary shaft, which are provided with eccentric weights and which are rotated by the crankshaft, of the type in which a ring gear rotationally connected to the crankshaft permanently meshes with a first pinion carried by one end of the primary balance shaft, and of the type in which a second pinion carried by the end of the primary balance shaft meshes with a pinion carried by one end of the secondary balance shaft.

There are numerous known examples of heat engines in which the balance shafts are carried by a housing which is attached to the engine block.

EP-A1-1 445 509 describes and illustrates an engine in which the housing comprises an intermediate shaft for driving the balance shafts, this intermediate shaft itself being driven by a camshaft of the engine by means of a toothed belt.

For the correct angular positioning of the intermediate shaft with respect to the camshaft, the end of the intermediate shaft comprises two non-symmetrical flats forming location elements for positioning the intermediate shaft with the aid of a suitable spanner before it is mounted.

This solution is not satisfactory, since it creates numerous difficulties for the operator responsible for the mounting.

SUMMARY OF THE INVENTION

To overcome this drawback, the invention proposes an arrangement in which the preliminary positioning of the balance shafts is provided by a removable and reusable pin which is interposed between the two balance shafts. For this purpose, the invention proposes an engine of the type described above, characterized in that transverse holes extend through the ends of the primary and secondary balance shafts and are intended to be aligned with one another in a specified position of the primary and secondary balance shafts before the balancer housing is mounted on the engine block, in order to receive a removable securing element.

According to other characteristics of the invention:
the removable securing element comprises means for fitting onto one end of one of the balance shafts;
the removable securing element consists of a pin;
the pin comprises a first straight arm, intended to pass through the holes, which is joined by a gripping loop to a second arm which comprises at least one curved portion which is complementary to the periphery of the end of a balance shaft, thus forming the fitting means, and the pin is made from a resilient material to enable the pin to be fitted onto said end;
the pin is made from a stainless steel wire, so as to be reusable.

The invention also relates to a method for mounting a balancer housing of the type described above, characterized in that it comprises, at least,
a first step in which the securing element is inserted into the transverse holes in the ends of the primary and secondary shafts;
a second step in which the ring gear is keyed in a specified angular position, so as to be rotationally connected to the crankshaft;
a third step in which the balancer housing is fixed to the engine block, and
a fourth step in which the securing element is removed from the transverse holes in the ends of the primary and secondary shafts.

BRIEF DESCRIPTION OF THE DRAWINGS

Other characteristics and advantages of the invention will be made clear by the following detailed description, the comprehension of which will be facilitated by reference to the attached drawings, in which:

FIG. 3 is a partial front view of a detail of the heat engine of FIG. 1.

In the following description, identical reference numerals denote parts which are identical or have similar functions.

Figure 1:
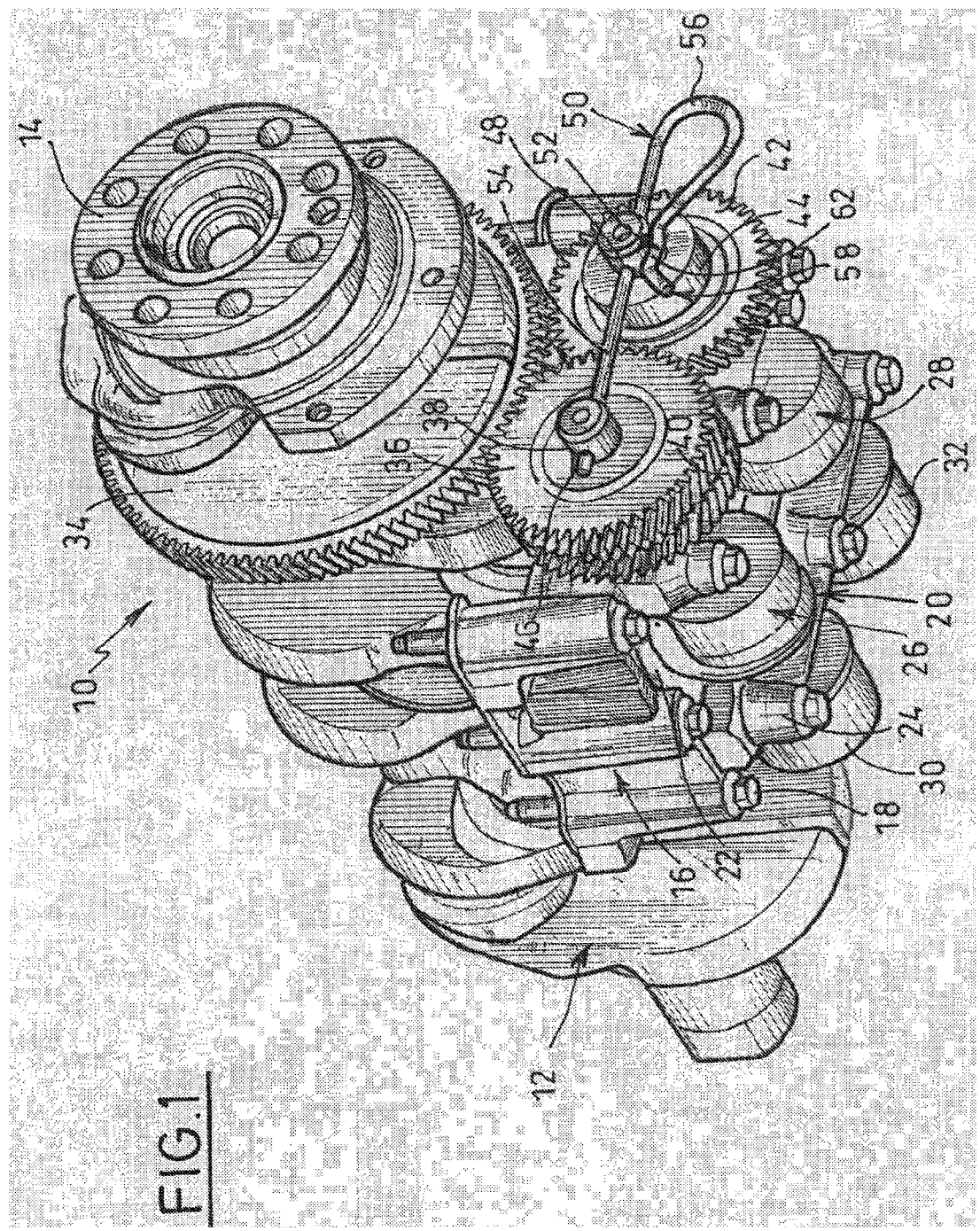
FIG. 1 is a partial perspective view of a heat engine according to the invention.
Figure 2:
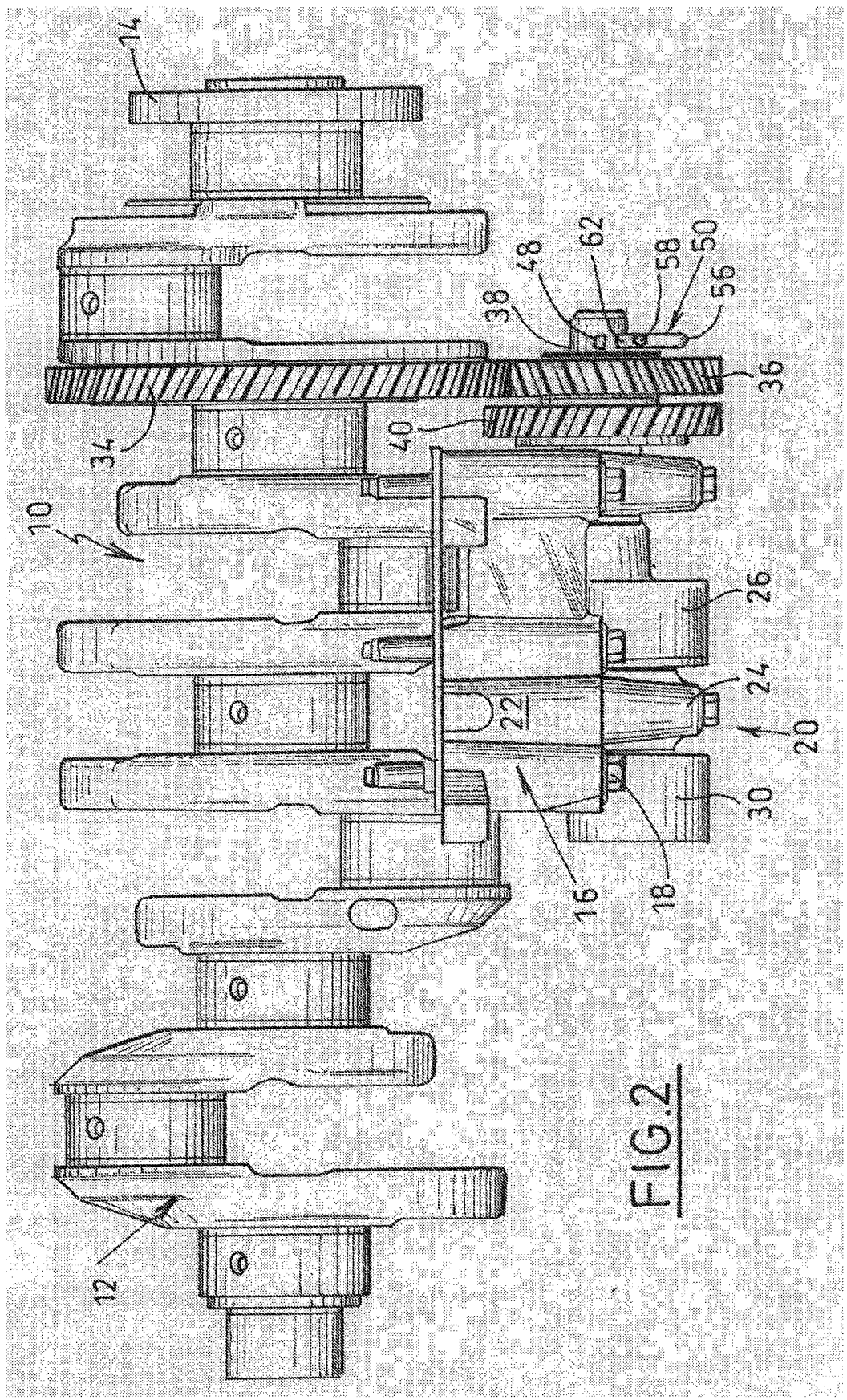
FIG. 2 is a partial side view of the heat engine of FIG. 1.

The figures provide a partial illustration of a heat engine 10 intended, in particular, to be fitted to a motor vehicle.

DETAILED DESCRIPTION OF THE PREFERRED EMBODIMENT

The engine 10 comprises, in a known way, at least one engine block (not shown) rotatably receiving a crankshaft 12, one end of which carries a hub 14 which is intended to receive an engine flywheel and a clutch mechanism (not shown) of the vehicle.

The engine 10 comprises, in a known way, a housing 16, called a balancer housing, which is fixed to the engine block by means of screws 18 which are received in holes (not shown) in the engine block.

The housing 16 is made, for example, by a foundry process, and has bearings 20, made by assembling two casings 22 and 24, which rotatably receive a pair of parallel balance shafts, namely a primary shaft 26 and a secondary shaft 28.

Each primary 26 or secondary 28 shaft is provided with associated eccentric weights 30, 32 which are intended to balance the engine 10 with respect to vibration, and the shafts are rotated by the crankshaft 12.

For this purpose, a ring gear 34 rotationally connected to the crankshaft 12 permanently meshes with a first pinion 36 which is carried by one end 38 of the primary balance shaft 26, and a second pinion 40 carried by the end 38 of the primary balance shaft 26 meshes with a pinion 42 carried by one end 44 of the balance shaft 28.

According to the invention, transverse holes 46, 48 extend through the ends 38, 44 of the primary 26 and secondary 28 balance shafts respectively and are intended to be aligned with each other, before the housing 16 is mounted on the engine block, to receive a removable securing element 50 which is provided for the following purposes:
to prevent impacts on the teeth of the pinions 36, 40 and 42 of the primary 26 and secondary 28 balance shafts during the transportation of the housing 16 toward the place of assembly of the engine 10;
to predetermine the relative angular position of the secondary balance shaft 28 with respect to the primary balance shaft 26, and
to predetermine the absolute angular position of the primary 26 and secondary 28 balance shafts with respect to the balancer housing 16 without using means of locking with respect to said housing 16, in order to determine the absolute angular position of the primary 26 and secondary 28 shafts with respect to the ring gear 34 of the crankshaft 12 when the housing 16 is mounted on the engine block.

Advantageously, the removable securing element 50 comprises means 52 for fitting onto one end of one of the balance shafts, so that it can be secured during transportation.

More specifically, the removable securing element 50 consists of a pin 50 which comprises a first straight arm 54 which is intended to pass through the holes 46, 48 and which is joined by a gripping loop 56 to a second arm 58 which comprises at least one curved portion 62 which is complementary to the periphery of the end of a balance shaft, thus forming the fitting means 52.

As shown in the figures, the second arm 58 comprises a curved portion 62 which is complementary to the periphery of the end 44 of the secondary balance shaft 28, but this arrangement is not a limiting feature of the invention, and the portion 62 could interact with the end 38 of the primary balance shaft 26 without changing the nature of the invention.

In the preferred embodiment of the invention, the pin 50 is made from a resilient material, to enable the pin 50 to be fitted onto the end 44 of the secondary balance shaft 28.

Advantageously, the pin 50 is made from a stainless steel wire, so as to be reusable several times.

To ensure the correct angular positioning of the primary 26 and secondary 28 shafts with respect to the ring gear 34 of the crankshaft 12, it is not necessary to use any marking system between the ring gear 34 of the crankshaft and the first pinion 36 of the primary balance shaft 26. In fact, it is simply necessary to determine the angular position of the toothed ring gear 34 rotationally connected to the crankshaft 12 before the mounting of the housing 16.

The secondary balance shaft 28, for its part, is obviously placed correctly in its angular position with respect to the primary balance shaft 26, since it permanently meshes with the latter and is placed in position beforehand with respect to the primary balance shaft 26 during the mounting of the housing 16.

In this configuration, a balancer housing 16 of the type described above can be mounted by a mounting method which comprises at least a first step in which the pin forming the securing element 50 is inserted into the transverse holes 46, 48 in the ends 38, 44 of the primary 26 and secondary 28 shafts.

The method also comprises a second step in which the ring gear 34 is keyed in a specified angular position, so as to be rotationally connected to the crankshaft 12. By way of example and without limitation of the invention, this keying can be carried out directly by keying the crankshaft 12 of the engine at a position associated with the top dead center or bottom dead center of one of the pistons of the engine.

The method also comprises a third step in which the balancer housing 16 is fixed to the engine block.

Finally, the method comprises a fourth step in which the securing element 50 is removed from the transverse holes 46, 48 in the ends 38, 44 of the primary 26 and secondary 28 shafts.

The invention therefore enables a housing 16 carrying balance shafts 26, 28 to be prepared in a simple and efficient way before it is mounted.

The invention claimed is:

1. A heat engine, comprising:
   at least one engine block that rotatably receives a crankshaft;
   a balancer housing fixed to the engine block, which rotatably receives a pair of parallel balance shafts, of a primary shaft and a secondary shaft, which are provided with eccentric weights and that are rotated by the crankshaft;
   a ring gear rotationally connected to the crankshaft to permanently mesh with a first pinion carried by one end of the primary balance shaft;
   a second pinion carried by the end of the primary balance shaft to mesh with a pinion carried by one end of the secondary balance shaft; and
   transverse holes extending through ends of the primary and secondary balance shafts and configured to be aligned with one another in a specified position of the primary and secondary balance shafts before the balancer housing is mounted on the engine block, to receive a removable securing element.

2. The heat engine as claimed in claim 1, wherein the removable securing element comprises means for fitting onto one end of one of the balance shafts.

3. The heat engine as claimed in claim 2, wherein the removable securing element includes a pin.

4. The heat engine as claimed in claim 3, wherein the pin comprises a first straight arm, configured to pass through the transverse holes, which is joined by a gripping loop to a second arm, which comprises at least one curved portion that is complementary to the periphery of the end of a balance shaft, thus forming the means for fitting, and wherein the pin is made from a resilient material to enable the pin to be fitted onto the end.

5. The heat engine as claimed in claim 4, wherein the pin is made from a stainless steel wire, so as to be reusable.

6. A method of mounting a balancer housing as claimed in claim 1, comprising:
   inserting the securing element into the transverse holes in the ends of the primary and secondary shafts;
   keying the ring gear in a specified angular position, so as to be rotationally connected to the crankshaft;
   fixing the balancer housing to the engine block; and
   removing the securing element from the transverse holes in the ends of the primary and secondary shafts.

* * * * *